United States Patent [19]

Taniguchi et al.

[11] 4,430,470
[45] Feb. 7, 1984

[54] FLAME RETARDANT ADDITIVES BASED ON ALUMINA TRIHYDRATE AND ETHYLENE POLYMER COMPOSITIONS, CONTAINING SAME, HAVING IMPROVED FLAME RETARDANT PROPERTIES

[75] Inventors: Seiho Taniguchi, Yokohama; Yuichiro Sakuma, Nagareyama; Tadashi Yoshii, Yokohama, all of Japan

[73] Assignee: Nippon Unicar Company Ltd., Tokyo, Japan

[21] Appl. No.: 392,782

[22] Filed: Jun. 30, 1982

[30] Foreign Application Priority Data

Oct. 8, 1981 [JP] Japan .................... 56-159447

[51] Int. Cl.$^3$ ............................ C08K 3/22; C08K 5/54
[52] U.S. Cl. ................................ 524/269; 174/110 A; 174/110 SR; 174/110 S; 252/609; 428/391; 524/437
[58] Field of Search ............... 252/609; 524/269, 437; 525/106; 556/451

[56] References Cited

U.S. PATENT DOCUMENTS

| | | | |
|---|---|---|---|
| 2,491,843 | 12/1949 | Wilcock | 556/451 |
| 2,647,911 | 8/1953 | Nitzsche et al. | 556/451 |
| 3,425,983 | 2/1969 | Wolfe, Jr. | 525/106 |
| 3,444,225 | 5/1969 | Boissieras et al. | 556/451 |
| 3,802,913 | 4/1974 | MacKenzie | 428/389 |
| 3,832,326 | 8/1974 | North et al. | 524/264 |
| 3,956,420 | 5/1976 | Kato et al. | 524/87 |
| 3,960,985 | 6/1976 | Cooper | 525/106 |
| 4,001,128 | 1/1977 | Penneck | 524/263 |
| 4,155,864 | 5/1979 | Martin | 252/609 |
| 4,190,614 | 2/1980 | Ito et al. | 525/106 |
| 4,265,801 | 5/1981 | Moody et al. | 525/106 |
| 4,353,817 | 10/1982 | Nakae et al. | 524/437 |
| 4,387,176 | 6/1983 | Frye | 524/437 |

FOREIGN PATENT DOCUMENTS 1294986  11/1972  United Kingdom .

*Primary Examiner*—John Kight, III
*Assistant Examiner*—R. A. White
*Attorney, Agent, or Firm*—James C. Arvantes; Robert C. Brown

[57] ABSTRACT

Flame retardant additive comprising alumina trihydrate and a methyl hydrogen polysiloxane which when added to ethylene polymers provide compositions which have improved flame retardant properties, have reduced gas evolution, do not drip or give off noxious gases on burning and are particularly useful as jacketing material about wire and cables.

19 Claims, No Drawings

FLAME RETARDANT ADDITIVES BASED ON ALUMINA TRIHYDRATE AND ETHYLENE POLYMER COMPOSITIONS, CONTAINING SAME, HAVING IMPROVED FLAME RETARDANT PROPERTIES

SUMMARY OF THE INVENTION

This invention relates to flame retardant additives based on alumina trihydrate and to ethylene polymer compositions containing these flame retardant additives. More particularly, this invention relates to moldable compositions, containing an ethylene polymer, alumina trihydrate and methyl hydrogen polysiloxane, which have improved flame retardant properties, have reduced gas evolution, do not drip or give off noxious gases on burning, and are particularly useful as jacketing material about industrial control cables and telephone wires and cables and as insulation about electrical conductors.

BACKGROUND OF THE INVENTION

Compositions, based on ethylene polymers such as ethylene-vinyl acetate copolymers and ethylene-ethyl acrylate copolymers, by reason of their advantageous properties, for example, corrosion resistance, toughness and abrasion resistance, have been widely used in molding and extrusion applications. Ethylene polymers, however, being flammable, require the addition of flame retardant additives in order that compositions based on these polymers be acceptable for use in the applications indicated. Illustrative of additives which have been used for this purpose are antimony oxide and halogenated flame retardant additives.

Compositions based on ethylene polymers, containing antimony oxide or a halogenated flame retardant additive, suffer the disadvantages, on burning, of producing dense smoke and/or evolving high levels of noxious and corrosive gases. Consequently, other additives such as hydrated inorganic compounds, exemplified by aluminum hydroxide and magnesium hydroxide have been added to ethylene polymer compositions for the purpose of improving the flame retardant properties thereof as disclosed in Japanese Published Patent Nos. 45-263 and 48-18570.

The presence of hydrated inorganic compounds in ethylene polymer compositions presents a number of advantages. When subjected to heat, these hydrated inorganic compounds undergo an endothermic reaction and liberate water. The water, in turn, decreases the flammability of the compositions, mitigates against the spread of flames and minimizes the emission of smoke. Furthermore, smoke and gases emitted by the described ethylene polymer compositions, containing hydrated inorganic compounds, are non-toxic. In addition, such compositions do not drip burning material.

A drawback, however, with respect to hydrated inorganic compounds is the large quantity that has to be used in order to impart a high degree of flame retardancy to ethylene polymer compositions. The addition of a large quantity of hydrated inorganic compounds decreases the mechanical strengths, particularly impact resistance, of the resultant compositions and impairs the flow properties thereof, represented by melt index, leading to poor moldability.

In order to remedy these drawbacks, alumina trihydrate, treated with a silicone coupling agent, has been proposed as a flame retardant additive to ethylene polymer compositions, as disclosed in Japanese Laid-Open Patent No. 56-20040. The technology of this patent is disadvantageous in that it is difficult to intimately mix the treated alumina trihydrate with the polymer matrix. Consequently, the resultant composition is unsatisfactory from the standpoint of mechanical and flow properties.

DESCRIPTION OF THE INVENTION

In one aspect, the present invention provides compositions, based on ethylene polymers, which exhibit improved flame retardant properties, do not drip or give off noxious gases on burning, have good moldability and retain good mechanical strength and elongation, when molded.

The compositions of this invention comprise an ethylene polymer, alumina trihydrate and a methyl hydrogen polysiloxane wherein the alumina trihydrate is present in an amount of about 25 to 65 percent by weight based on the total weight of the composition and the methyl hydrogen polysiloxane is present in an amount of about 0.05 to about 2 percent by weight, based on the weight of the alumina trihydrate.

As to the alumina trihydrate, insufficient flame retardancy is achieved on using less than about 25 percent by weight while above 65 percent by weight non-uniform distribution of the alumina trihydrate occurs in the ethylene polymer compositions, leading to poorer mechanical properties and poor flowability of the compositions.

As previously stated, the methyl hydrogen polysiloxane is present in the compositions in an amount of about 0.05 to about 2 percent by weight, based on the weight of the alumina trihydrate. It is preferred that the alumina be surface treated with the methyl hydrogen polysiloxane and the resultant surface treated alumina trihydrate added to the ethylene polymer compositions, in the amounts previously noted. Using less than about 0.05 methyl hydrogen polysiloxane, results in inferior results with respect to the mechanical strength and flow characteristics of the resultant composition. At a level in excess of about 2 percent by weight, methyl hydrogen polysiloxane causes the alumina trihydrate to aggregate, forming coarse particles which are difficult to disperse in the ethylene polymer compositions.

Alumina trihydrate, useful for purposes of this invention, has an average particle size ranging from 0.01 to 30 $\mu$m. Under an average particle size of 0.01 $\mu$m, the particles form an aggregate which does not disperse in ethylene polymers, resulting in decreased impact strength and impaired flame retardancy of the ethylene polymer compositions. Above an average particle size of 30 $\mu$m, the resultant ethylene polymer compositions are characterized by poor flame retardant properties, poor mechanical strengths and moldings made therefrom have inferior surface gloss.

Alumina trihydrate is a white crystalline powder and can be represented by the formula:

$$Al_2O_3 \cdot 3H_2O \text{ or } Al(OH)_3$$

The methyl hydrogen polysiloxanes of this invention can be represented by the formula:

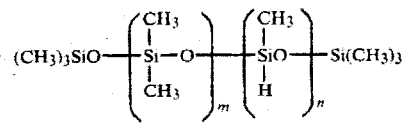

Formula I wherein m is an integer from 0 to 50 and n is an integer from 10 to 100. Methyl hydrogen polysiloxanes wherein n is under 10 or over 100 are not satisfactory for purposes of this invention. A polysiloxane, as defined above, wherein n is under 10 has insufficient bond strength to alumina trihydrate particles, and ethylene polymer compositions containing such polysiloxanes do not have satisfactory mechanical properties. On the other hand, polysiloxanes, as defined above, wherein n is above 100 are too high in viscosity and poor in terms of adhesion to the alumina trihydrate particles.

Ethylene polymers, which are used in the compositions of this invention, include low density polyethylene, ethylene-vinyl acetate copolymers and ethylene-ethyl acrylate copolymers. Particularly desirable are ethylene-vinyl acetate copolymers containing about 2 to 50 percent by weight vinyl acetate and having a melt index of about 0.5 to 30 g/10 min; and ethylene-ethyl acrylate copolymers containing about 2 to about 50 percent by weight ethyl acrylate and having a melt index of about 0.5 to 30 g/10 min. Also suitable are low density ethylene polymers with α-olefin produced under low pressure conditions as disclosed in U.S. Pat. No. 3,666,736 and U.S. Pat. No. 4,011,382, the disclosure of these patents included herein by reference. As a rule, the ethylene polymers are solid materials at room temperature and contain at least about 30 percent by weight ethylene.

The ethylene polymer compositions can contain normally used additives such as antioxidants, slip agents, ultra violet light absorbers, metal protectants, antistatic agents, pigments, thickeners, blowing agents, crosslinking agents, crosslinking aids and the like in amounts well known to those skilled in the art. In cases where feasible, crosslinking can be effected by electron radiation.

The compositions of this invention can be prepared by mixing on a two roll mill, a kneader, an internal mixer and the like and molded by extrusion or injection molding into sheets, pipes, about wire and cable and the like.

Methyl hydrogen polysiloxane can be added to alumina trihydrate or blended integrally with the ethylene polymer and alumina trihydrate when all materials are mixed together.

Treatment of alumina trihydrate, preparation of compositions, tests and results thereof are described below and in Table I.

TREATMENT OF ALUMINA TRIHYDRATE

Into a Henschel mixer, there was placed a predetermined quantity of alumina trihydrate having an average particle size of 3.85 μm. A varied quantity of methyl hydrogen polysiloxane, wherein n was 20 and m was 0 (Formula I), dissolved in butanol, was added to the Henschel mixer from a separatory funnel over a 5 minute period while the Henschel mixer was operating at 780 rpm. After dropwise addition of the methyl hydrogen polysiloxane, the Henschel mixer was operated for an additional ten minutes at 890 rpm. After the ten minute period, the treated alumina trihydrate was transferred to a tray and dried for one hour at a temperature of 150° C.

PREPARATION OF ETHYLENE POLYMER COMPOSITIONS

Compositions were prepared by compounding the ingredients at a temperature of 150° C. in an internal mixer. Each composition was molded into test specimens 15 cm by 15 cm by 2 mm in thickness under the following conditions:

Temperature: 180° C.
Pressure: 100 Kg/cm$^2$
Time of Molding Cycle: 15 minutes

Specimens were then subjected to tests described below. Test results are tabulated in Table I.

Amounts noted in Table I are in percent by weight.

(1) Oxygen Index

Oxygen index was determined using the apparatus as provided in JIS K7201 (method for testing flammability of polymeric materials using the oxygen index method). The oxygen index is defined as the minimum concentration of oxygen, expressed as volume percent, in a mixture of oxygen and nitrogen that will just support flaming combustion of a material initially at room temperature. The greater the oxygen index, the more flame-retardant the given material.

(2) Smoke Concentration

Smoke concentration was determined by measuring with a photometer the light transmission across the smoke, generated by combustion of a specimen, which passes through a chimney attached to the top of the glass column in which combustion takes place.

(3) Combustion Gas

The combustion gas generated in the measurement of oxygen index was ranked according to the Swiss Standard.

| RANKING OF THERMAL DECOMPOSITION GAS (According to Swiss Standard) | | |
|---|---|---|
| RANKING | EMITTED GAS* | STANDARD MATERIAL |
| 1 | Cyanogas, nitrogen oxide, phosgene, etc. (toxic) | Celluloid |
| 2 | Strong acids, formaldehyde, etc. (highly irritant) | Rigid polyvinyl chloride |
| 3 | Weak acids and bases (slightly irritant) | Dry wood |
| 4 | Others (not irritant) | Pure polyethylene |

*excluding carbon monoxide (4) Tensile strength and elongation—Measured according to Section 4.3 of JIS K6730 (1980).

Symbols used in Table I have the following meaning:

Copolymer 1—an ethylene-vinyl acetate copolymer containing 18 percent by weight vinyl acetate and having a melt index of 2.5 g/10 min.

Copolymer 2—ethylene-ethyl acrylate copolymer containing 18 percent by weight ethyl acrylate and having a melt index of 6 g/10 min.

A. Alumina trihydrate (not treated)

B. Alumina trihydrate—surface treated with 0.03 percent by weight methyl hydrogen polysiloxane.

C. Alumina trihydrate—surface treated with 0.1 percent by weight methyl hydrogen polysiloxane.

D. Alumina trihydrate—surface treated with 0.5 percent by weight methyl hydrogen polysiloxane.

E. Alumina trihydrate—surface treated with 1.0 percent by weight methyl hydrogen polysiloxane.

Melt index noted herein was determined according to ASTM test D 1238.

set forth below, as previously described and testing these compositions, also as previously described.

TABLE I

| | Control 1 | Control 2 | Control 3 | Control 4 | Example 1 | Example 2 | Control 5 | Example 3 | Example 4 | Control 6 | Example 5 |
|---|---|---|---|---|---|---|---|---|---|---|---|
| Components (%) | | | | | | | | | | | |
| Copolymer - 1 | 66 | 59 | 49 | 39 | 49 | 39 | 39 | 39 | 39 | | |
| Copolymer - 2 | | | | | | | | | | 39 | 39 |
| A | | 20 | 50 | 60 | | | | | | 60 | |
| B | | | | | | | 60 | | | | |
| C | | | | | | | | 60 | | | |
| D | | | | | 50 | 60 | | | | | |
| E | | | | | | | | | 60 | | 60 |
| Decabromodiphenyl oxide | 25 | 15 | | | | | | | | | |
| Antimony trioxide | 8 | 5 | | | | | | | | | |
| Di-α-cumyl peroxide | 1 | 1 | 1 | 1 | 1 | 1 | 1 | 1 | 1 | 1 | 1 |
| Oxygen index | 28.0 | 28.5 | 25.0 | 27.0 | 25.0 | 28.0 | 28.5 | 28.0 | 28.0 | 28.0 | 27.5 |
| Smoke density (%) | 97 | 40 | 0 | 0 | 0 | 0 | 0 | 0 | 0 | 0 | 0 |
| Combustion gas rating | 2 | 3 | 4 | 4 | 4 | 4 | 4 | 4 | 4 | 4 | 4 |
| Tensile strength (kg/cm$^2$) | 165 | 104 | 130 | 89 | 151 | 133 | 105 | 121 | 142 | 74 | 115 |
| Elongation (%) | 420 | 290 | 260 | 200 | 480 | 460 | 330 | 405 | 450 | 230 | 385 |
| Melt Index | | | | | | | | | | | 1.9 |

Referring to Table I:

Control 1—composition containing a commonly used bromine flame retardant and antimony oxide. Upon combustion, the composition gave off a large volume of black smoke and suffocating gases.

Control 2—composition containing bromine flame retardant, antimony oxide and untreated alumina trihydrate. Some improvement in properties as compared to Control 1 but properties are still poor.

Control 3 and Control 4—compositions containing only untreated alumina trihydrate as the flame retardant. Fifty percent by weight alumina trihydrate, as shown by Control 3, was not enough to achieve sufficient flame retardancy. Sixty percent by weight alumina trihydrate, as shown by Control 4, caused a decrease in tensile strength and elongation of the composition.

Control 5—composition containing alumina trihydrate treated with 0.03 percent methyl hydrogen polysiloxane. This composition exhibited a decrease in tensile strength and elongation.

Control 6—composition based on an ethylene-ethyl acrylate copolymer and containing untreated alumina trihydrate. The composition had poor tensile strength and elongation.

Example 1 and Example 2—compositions containing 50 percent by weight and 60 percent by weight, respectively, of alumina trihydrate treated with methyl hydrogen polysiloxane.

Upon combustion, the compositions did not give off smoke. The emitted gas, in each gas, was odorless. Each composition had sufficient tensile strength and elongation.

Example 3 and Example 4—compositions containing 60 percent by weight treated alumina trihydrate, treated with 0.1 and 1.0 percent by weight, respectively of methyl hydrogen polysiloxane. Compositions had acceptable properties.

Example 5—composition containing 60 percent by weight treated alumina trihydrate had significantly improved tensile strength and elongation as compared to Control 6.

EXAMPLE 6

This Example and Control 7 were conducted by preparing compositions, the formulations of which are

| | Parts By Weight |
|---|---|
| Example 6 | |
| Copolymer 1 | 39 |
| Alumina trihydrate-surface treated with 0.5 percent by weight of a methyl hydrogen polysiloxane falling within the scope of Formula I wherein m = 20 and n = 20 | 60 |
| Di-α-cumyl peroxide | 1 |
| Oxygen index | 28.0 |
| Smoke density (%) | 0 |
| Combustion gas rating | 4 |
| Tensile strength (Kg/cm$^2$) | 133 |
| Elongation (%) | 435 |
| Control 7 | |
| Copolymer 2 | 39 |
| Alumina trihydrate-surface treated with 1.0 percent by weight of vinyl trimethoxy silane | 60 |
| Di-α-cumyl peroxide | 1 |
| Oxygen index | 27 |
| Smoke density | 0 |
| Combustion gas rating | 4 |
| Tensile strength (Kg/cm$^2$) | 95 |
| Elongation (%) | 350 |
| Melt index | 0.5 |

What is claimed is:

1. A flame retardant additive comprising an alumina trihydrate having an average particle size of from about 0.01 to about 30 μm and a methyl hydrogen polysiloxane of the formula:

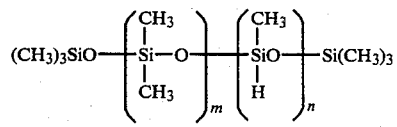

wherein m is an integer from 0 to 50 and n is an integer from 10 to 100, said polysiloxane being present in an amount of about 0.05 to about 2 percent by weight based on the weight of the alumina trihydrate.

2. A flame retardant additive as defined in claim 1 wherein the alumina trihydrate is surface treated with the polysiloxane defined in claim 1.

3. A flame retardant additive as defined in claim 1 wherein in the formula of said polysiloxane m is 20 and n is 20.

4. A composition comprising an ethylene polymer, alumina trihydrate having an average particle size of from about 0.01 μm to about 30 μm and a methyl hydrogen polysiloxane of the formula:

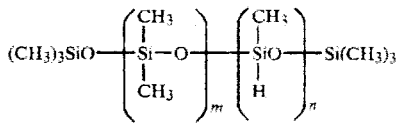

wherein m is an integer from 0 to 50 and n is an integer from 10 to 100, said alumina trihydrate being present in an amount of about 25 to 65 percent by weight, based on the total weight of the composition and said polysiloxane being present in an amount of about 0.05 to about 2 percent by weight, based on the weight of the alumina trihydrate.

5. A composition as defined in claim 4 wherein the ethylene polymer is an ethylene-vinyl acetate copolymer.

6. A composition as defined in claim 4 wherein the ethylene polymer is an ethylene-ethyl acrylate copolymer.

7. A composition as defined in claim 4 wherein the said alumina trihydrate is surface treated with said polysiloxane.

8. A composition as defined in claim 4 wherein in the formula of said polysiloxane, m is 0 and n is 20.

9. A composition as defined in claim 4 wherein in the formula of said polysiloxane, m is 20 and n is 20.

10. A composition comprising an ethylene polymer which is an ethylene-vinyl acetate copolymer or an ethylene-ethyl acrylate copolymer, having a melt index of about 0.5 to 30 g/10 min. and a vinyl acetate or ethyl acrylate content of about 2 to 50 percent by weight, an alumina trihydrate having an average particle size of from about 0.01 μm to about 30 μm and a methyl hydrogen polysiloxane of the formula:

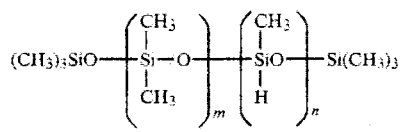

wherein m is an integer from 0 to 50 and n is an integer from 10 to 100.

11. A composition as defined in claim 10 wherein the ethylene polymer is an ethylene-ethyl acrylate copolymer having a melt index of about 6 g/10 min.

12. A composition as defined in claim 10 wherein the ethylene polymer is an ethylene-vinyl acetate copolymer having a melt index of about 2.5 g/10 min.

13. A composition as defined in claim 4 wherein the ethylene polymer is polyethylene.

14. A composition as defined in claim 4 wherein the ethylene polymer is an ethylene-α-olefin copolymer produced by a low pressure process.

15. A composition as defined in claim 4 containing an organic peroxide.

16. The crosslinked product of the composition defined in claim 15.

17. A flame retardant additive as defined in claim 1 wherein in the formula of said polysiloxane m is 0 and n is 20.

18. A wire or cable having as jacketing thereon the composition or crosslinked product of the composition defined in claim 4.

19. An electrical conductor having as insulation thereon the composition or crosslinked product of the composition defined in claim 4.

* * * * *